(12) United States Patent
Uchida

(10) Patent No.: US 9,208,379 B2
(45) Date of Patent: Dec. 8, 2015

(54) IMAGE PROCESSING APPARATUS, IMAGE PROCESSING METHOD, IMAGE PROCESSING SYSTEM, AND STORAGE MEDIUM STORING PROGRAM

(71) Applicant: CANON KABUSHIKI KAISHA, Tokyo (JP)

(72) Inventor: Yumiko Uchida, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 14/090,957

(22) Filed: Nov. 26, 2013

(65) Prior Publication Data

US 2014/0147004 A1     May 29, 2014

(30) Foreign Application Priority Data

Nov. 27, 2012    (JP) ................................. 2012-258557

(51) Int. Cl.
*G06K 9/00*      (2006.01)
*G09G 5/00*      (2006.01)

(52) U.S. Cl.
CPC .................................. *G06K 9/00442* (2013.01)

(58) Field of Classification Search
CPC ................... G06K 9/00; G09G 5/00
USPC ........................................ 382/103, 107, 236
See application file for complete search history.

(56) References Cited

U.S. PATENT DOCUMENTS

| | | | |
|---|---|---|---|
| 9,008,438 B2 * | 4/2015 | Kawanishi et al. | 382/195 |
| 2010/0092079 A1 * | 4/2010 | Aller | 382/165 |
| 2010/0329575 A1 * | 12/2010 | Scalise et al. | 382/218 |
| 2013/0051615 A1 * | 2/2013 | Lim et al. | 382/103 |

FOREIGN PATENT DOCUMENTS

| | | |
|---|---|---|
| JP | P2010-26818 A | 2/2010 |
| JP | P2012-141779 A | 7/2012 |

* cited by examiner

*Primary Examiner* — Abolfazl Tabatabai
(74) *Attorney, Agent, or Firm* — Canon U.S.A., Inc. IP Division

(57) ABSTRACT

An image processing apparatus connectable to a terminal which captures an image includes an acquisition unit configured to acquire augmented information and attribute information from feature information extracted from a captured image, a processing unit configured to generate, if a plurality of pieces of the feature information is extracted, at least one piece of new augmented information by using a plurality of pieces of the augmented information acquired by the acquisition unit, based on the attribute information, and a transmission unit configured to transmit the new augmented information generated by the processing unit to the terminal.

26 Claims, 23 Drawing Sheets

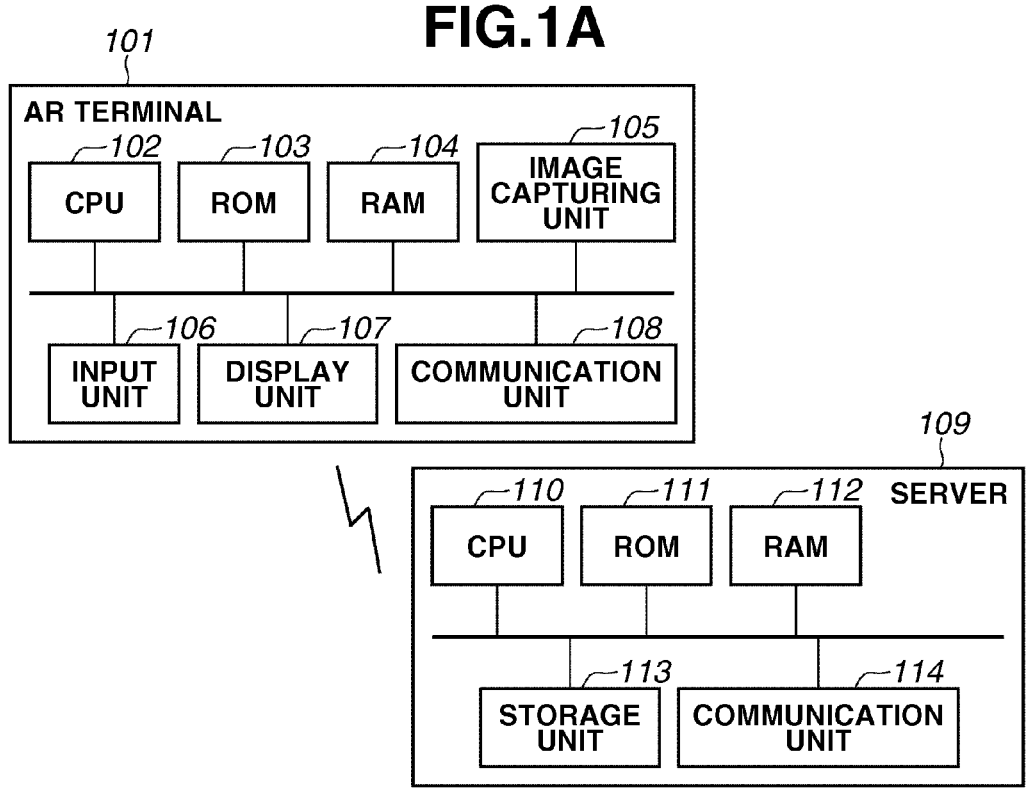
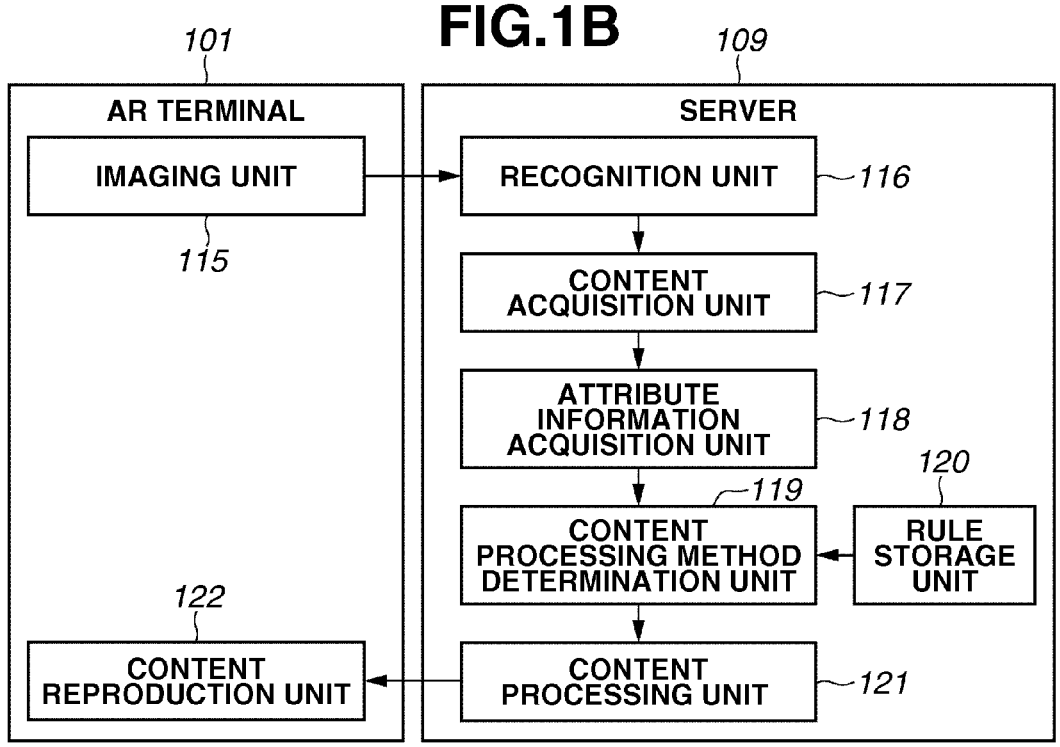

| IMAGE FEATURE QUANTITY | IDENTIFICATION INFORMATION |
|---|---|
| ...... | ID001 |
| ...... | ID002 |
| ...... | ID003 |
| | |

IMAGE FEATURE QUANTITY MANAGEMENT

| IDENTIFICATION INFORMATION | AR CONTENT | ATTRIBUTE INFORMATION |
|---|---|---|
| ID001 | A | category=financial results<br>company=company A<br>year=2012/1Q<br>: |
| ID002 | B | : |
| ID003 | C | : |
| : | : | : |

IDENTIFICATION INFORMATION/CONTENT/ATTRIBUTE INFORMATION MANAGEMENT

| RULE No. | RULE |
|---|---|
| 1 | if<br>a.category=financial results AND b.category=financial results AND<br>a.company=b.company AND<br>:<br>then<br>combine a and b to generate a graph by year. |
| 2 | if<br>a.category=financial results AND b.category=financial results AND<br>a.year=b.year AND<br>:<br>then<br>combine a and b to generate a graph by company. |
| | : |
| | : |

CONTENT PROCESSING RULE

COMPANY A

FINANCIAL RESULTS Q1 2012

402

■ External Environment
· Recovery of the world economy remains
· Strong yen compared to previous year

COMPANY B

FINANCIAL RESULTS Q1 2012

■ Summary of Business Results

◇ Economic Conditions
   Despite the sharp appreciation of the yen and a growing concern over an overseas economic slowdown, the domestic economy is on a recovery trend in terms of demand.

|  | Q1 Figures (billion |
|---|---|
| Sales | 829.2 |
| Gross Profit | 390.9 |
| Business Profit | 82.7 |
| Net Profit | 61.5 |

◇ Overview of Business Results

|  | Q1 Figures (billion yen) |
|---|---|
| Sales | 459.3 |
| Gross Profit | 120.2 |
| Business Profit | 15.6 |
| Net Profit | 10.8 |

■ COMPANY A
□ COMPANY B

|  | COMPANY A |
|---|---|
| SALES | 964.8 |
| GROSS PROFIT | 459.5 |
| BUSINESS PROFIT | 94.6 |
| NET PROFIT | 61.4 |

FIG.5B

|  | COMPANY B |
|---|---|
| SALES | 459.3 |
| GROSS PROFIT | 120.2 |
| BUSINESS PROFIT | 15.6 |
| NET PROFIT | 10.8 |

FIG.5C

|  | COMPANY A | COMPANY B |
|---|---|---|
| SALES | 964.8 | 459.3 |
| GROSS PROFIT | 459.5 | 120.2 |
| BUSINESS PROFIT | 94.6 | 15.6 |
| NET PROFIT | 61.4 | 10.8 |

FIG.10

| RULE No. | RULE |
|---|---|
| 1 | if<br> a and b are arranged side-by-side<br>then<br> obtain difference between a and b. |
| 2 | if<br> a is superimposed on b<br>then<br> combine a and b. |
| 3 | if<br> a is aligned but b is skewed<br>then<br> display only a. |
|  | : |

FIG.12A

| PURCHASE ORDER ID | PRODUCT CODE | PRODUCT NAME | UNIT PRICE | QUANTITY | AMOUNT |
|---|---|---|---|---|---|
| 120610009 | 0021 | COMPONENT A | 10,000 | 4 | 40,000 |
| 120610009 | 0187 | COMPONENT D | 3,000 | 4 | 12,000 |

FIG.12B

| PURCHASE ORDER ID | PRODUCT CODE | PRODUCT NAME | UNIT PRICE | QUANTITY | AMOUNT |
|---|---|---|---|---|---|
| 120612003 | 0021 | COMPONENT A | 10,000 | 8 | 80,000 |
| 120612003 | 0953 | COMPONENT F | 1,000 | 100 | 100,000 |
| 120612003 | 0425 | COMPONENT L | 12,000 | 3 | 36,000 |

| RULE No. | RULE |
|---|---|
| 1 | if<br>category of a is instruction video AND<br>type of b is ticket for children<br>then<br>switch a to instruction video for children. |
| 2 | if<br>category of a is instruction video AND<br>type of b is ticket for foreigners<br>then<br>switch a to instruction video in English. |
| | ⋮ |
| | ⋮ |

FIG.17

| RULE No. | RULE |
|---|---|
| 1 | if<br>　a is superimposed on b<br>then<br>　highlight a and zoom out b. |
| ⋮ | ⋮ |
| ⋮ | ⋮ |
| ⋮ | ⋮ |

1701

IMAGE PROCESSING APPARATUS, IMAGE PROCESSING METHOD, IMAGE PROCESSING SYSTEM, AND STORAGE MEDIUM STORING PROGRAM

BACKGROUND OF THE INVENTION

1. Field of the Invention

The present invention relates to an image processing apparatus which processes augmented reality information, an image processing method, an image processing system, and a storage medium storing a program thereof.

2. Description of the Related Art

Nowadays, augmented reality techniques for displaying and superimposing augmented information on a video or an image of real space captured by a camera are widely used. The augmented reality techniques associate an AR content, which is an image or a video that provides augmented reality to an object in the real space, with an image feature quantity included in the captured video or image, and then display and superimpose the AR content on the captured video or image.

Especially, in recent years, utilization of an AR content that can be reproduced is enhanced. An AR content can be reproduced by associating the AR content with an image feature quantity of a paper document or a marker printed on the paper document and then capturing an image of the paper document with a terminal having an imaging function. If there are two or more documents when an AR content is used in this manner, the documents are associated with each other in many cases. If two or more AR markers or image feature quantities exist in the real space where an image of documents has been captured, there is a need for expressing the relationship between the documents using an AR content.

Japanese Patent Application Laid-Open No. 2010-26818 discusses a technique by which when two or more AR markers exist in the captured image of real space, the display of an AR content can be changed according to a combination of the AR markers defined in advance. Further, Japanese Patent Application Laid-Open No. 2012-141779 discusses a technique by which if two or more AR markers of the same exist in the captured image of real space, an AR content different from the one displayed when each of the AR markers is separately viewed can be displayed.

According to the above-described techniques, defining a combination of feature information such as markers in advance allows the display of an AR content to be changed according to the combination, when two or more pieces of feature information exist in the captured image of real space.

However, both of the above-described techniques require pre-definition of a combination of feature information. Thus, associating an AR content with each combination of feature information is difficult when the number of pieces of feature information is great. Further, only one display style can be associated with each combination of feature information.

SUMMARY OF THE INVENTION

The present invention is directed to an image processing apparatus which can flexibly generate, if an image of two or more pieces of feature information associated with augmented information is captured, new augmented information by using a plurality of pieces of augmented information without pre-defining an AR content according to each combination of feature information, and is further directed to a method, a system, and a program thereof.

According to an aspect of the present invention, an image processing apparatus connectable to a terminal which captures an image includes an acquisition unit configured to acquire augmented information and attribute information from feature information extracted from a captured image, a processing unit configured to generate, if a plurality of pieces of the feature information is extracted, at least one piece of new augmented information by using a plurality of pieces of the augmented information acquired by the acquisition unit, based on the attribute information, and a transmission unit configured to transmit the new augmented information generated by the processing unit to the terminal.

According to another aspect of the present invention, an image processing apparatus connectable to a terminal which captures an image includes an acquisition unit configured to acquire augmented information from feature information extracted from a captured image, a processing unit configured to generate, if a plurality of pieces of the feature information is extracted, at least one piece of new augmented information by using a plurality of pieces of the augmented information acquired by the acquisition unit, based on a positional relationship between the extracted pieces of the feature information, and a transmission unit configured to transmit the new augmented information generated by the processing unit to the terminal.

Further features of the present invention will become apparent from the following description of exemplary embodiments (with reference to the attached drawings).

BRIEF DESCRIPTION OF THE DRAWINGS

FIGS. 1A and 1B illustrate a configuration of a system according to a first exemplary embodiment of the present invention.

FIGS. 3A, 3B, and 3C illustrate data formats according to the first exemplary embodiment.

FIGS. 4A, 4B, and 4C are schematic diagrams of AR content processing according to the first exemplary embodiment.

FIGS. 5A, 5B, and 5C illustrate a data format used for AR contents according to the first exemplary embodiment.

FIG. 10 illustrates a data format according to the second exemplary embodiment.

FIGS. 12A and 12B illustrate a data format used for AR contents according to the second exemplary embodiment.

FIG. 15 illustrates a data format according to a third exemplary embodiment of the present invention.

FIG. 17 illustrates a data format according to a fourth exemplary embodiment of the present invention.

DESCRIPTION OF THE EMBODIMENTS

Figure 2A:
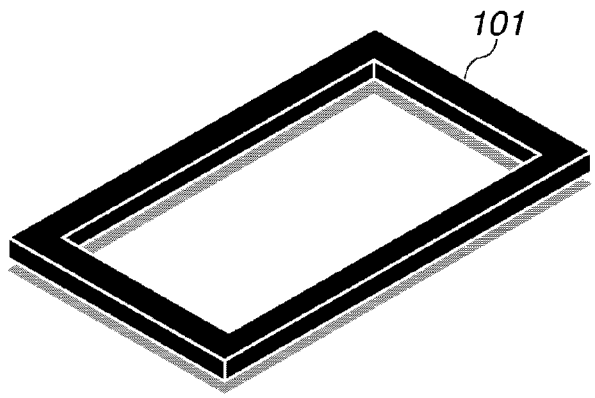
FIGS. 2A, 2B, 2C, and 2D are schematic diagrams of an AR terminal according to the present embodiment.

Various exemplary embodiments, features, and aspects of the invention will be described in detail below with reference to the drawings.

FIG. 1A illustrates a configuration of an augmented reality system according to a first exemplary embodiment of the present invention. The augmented reality system according to the present embodiment includes an AR terminal 101 and a server 109. The AR terminal 101 and the server 109 can be connected to each other via the Internet or an intranet by a communication unit 108 and a communication unit 114. The connection to the Internet or the intranet can be performed, for example, via wireless communication or cellular phone lines.

The AR terminal 101 is a tablet terminal, a cellular phone terminal, or a digital camera, any one of which includes at least an image capturing function of real space. The AR terminal 101 can display and superimpose an AR content, which is an image or a video that can provide augmented reality, on a captured image or video. In the following description, the AR content is also called augmented information. The augmented information is, for example, an augmented image superimposed on information of a captured image of the real world when the captured image is displayed. A central processing unit (CPU) 102 executes a control program stored in a read-only memory (ROM) 103 to control the AR terminal 101. The ROM 103 stores a program to be executed by the AR terminal 101. When the AR terminal 101 executes the program, the system including the AR terminal 101 functions as various units that execute each type of processing described according to the flowcharts below. A random access memory (RAM) 104 temporarily stores various types of data sent from each unit of the AR terminal 101. Further, the RAM 104 loads the program so that the program can be executed by the AR terminal 101. An image capturing unit 105 includes an optical device and an imaging element. The image capturing unit 105 captures an image of an object according to an instruction from the CPU 102. An input unit 106 includes an operation button and a touch panel, and receives instructions from the user. A display unit 107 includes a liquid crystal panel, and displays data to be processed according to the present embodiment.

The server 109 manages and processes the AR content to be provided to the AR terminal 101. A CPU 110 controls the server 109 by executing a control program stored in a ROM 111. The ROM 111 stores the program executed by the server 109. By the CPU 110 executing the program, the system functions as various units that execute each type of processing described according to the flowcharts below. A RAM 112 temporarily stores various types of data sent from each unit of the server 109. Further, the RAM 112 loads the program so that the program can be executed by the server 109. A storage unit 113 retains data to be processed according to the present embodiment. For example, the storage unit 113 retains identification information used for identifying the AR content and data of the AR content. A flash memory and a hard disk drive (HDD) can be used as the storage unit 113.

According to the present embodiment, the processing corresponding to each step of the flowcharts described below is realized by the CPU 102 or the CPU 110 using software. However, a part or whole of the processing may be realized by hardware such as an electronic circuit.

FIG. 1B illustrates the configuration of the data processing portions of the augmented reality system according to the present embodiment. An imaging unit 115 of the AR terminal 101 captures an image or a video of real space and transmits the captured image or video to the server 109. Then, a content reproduction unit 122 obtains a content to be superimposed on the captured image or video from the server 109 and displays the content on the display unit 107.

The server 109 provides an augmented reality content to the AR terminal 101 according to the captured image or video received. First, a recognition unit 116 analyzes the captured image or video, and recognizes feature information such as an AR marker or an image feature. Although the recognition unit 116 is in the server 109 in FIG. 1B, the recognition unit 116 can be included in the AR terminal 101. The feature information is identification information to be used for identifying the corresponding AR content.

A content acquisition unit 117 and an attribute information acquisition unit 118 acquire content and attribute information associated with the identification information.

The server 109 includes a rule storage unit 120 which defines a rule of the content processing method according to the attribute information. According to a rule (definition information) stored in the rule storage unit 120, a content processing method determination unit 119 determines the processing method and a content processing unit 121 processes the content using the determined processing method. The processed content is sent to the AR terminal 101. The content reproduction unit 122 of the AR terminal 101 displays the AR content sent from the server 109 on the display unit 107.

Figure 2B:
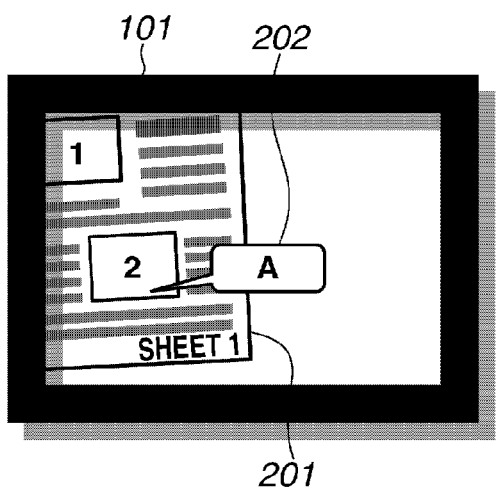
Figure 2C:
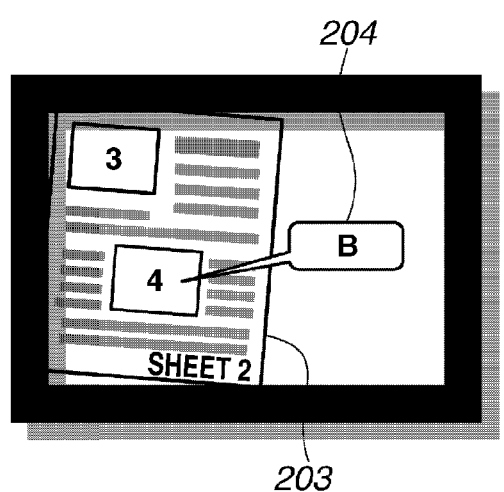
Figure 2D:
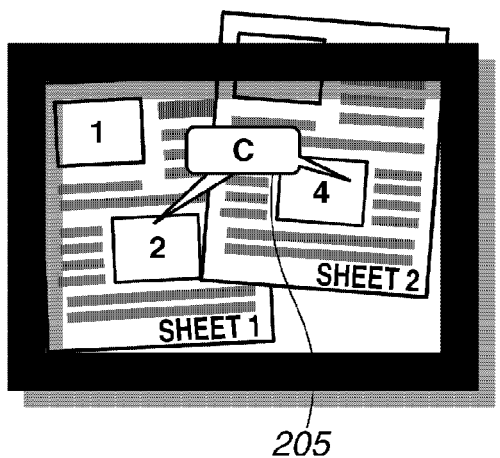

FIGS. 2A, 2B, 2C, and 2D illustrate the AR terminal 101 and the augmented reality information viewed via the AR terminal 101. FIG. 2A illustrates the appearance of the AR terminal 101 being a tablet terminal. FIG. 2B illustrates a state where the AR terminal 101 is held over a sheet 201. In FIG. 2B, an AR content 202 is displayed on the screen of the AR terminal 101 as augmented reality information, based on the feature information embedded in the sheet 201. FIG. 2C illustrates a state where the AR terminal 101 is held over a sheet 203 different from the sheet 201 illustrated in FIG. 2B. In FIG. 2C, an AR content 204 is displayed on the screen of the AR terminal 101 as augmented reality information, based on the feature information embedded in the sheet 203. FIG. 2D illustrates a state where the AR terminal 101 is held over the sheets 201 and 203. In FIG. 2D, an AR content 205, which is different from those displayed in FIGS. 2B and 2C, is displayed on the AR terminal 101. The AR content 205 is obtained by performing some kind of processing on the AR content 202 and the AR content 204. Thus, the user can view the AR content 205 which the user cannot view when the user views the sheet 201 and the sheet 203 separately.

FIGS. 3A, 3B, and 3C illustrate data formats used by the system according to the present embodiment. Data 301 illustrated in FIG. 3A and data 302 illustrated in FIG. 3B are used for managing the association of feature information, such as an image feature quantity included in a captured image or video, with an AR content and attribute information. The feature information is used as identification information for identifying the AR content. The attribute information can be information associated with the identification information but can also be information associated with the AR content. The attribute information includes, for example, information indicating a category of the AR content, additional information according to the category, and version information and preparation date of the document. A content processing rule 303 illustrated in FIG. 3C is definition information that defines the processing of an AR content according to a combination of attribute information. The content processing rule 303 is managed by the rule storage unit 120. Structured data such as XML can be used as the data of an AR content. If structured data is used, AR contents can be easily combined and a difference between the contents can be easily obtained.

Further, according to the example described below, an image feature quantity is used as an example of identification information. The image feature quantity is obtained by calculating a local feature quantity corresponding to a local feature point, based on the local feature point and an image feature in the vicinity thereof. More precisely, the pixel values of a total of 9 pixels, which are a pixel of an image obtained by using Harris operator and 8 adjacent pixels, are obtained. Then, the point having the largest pixel value out of the 9 pixel values is extracted as the local feature point. The method for extracting the local feature point is not limited to the feature point extraction method using the Harris operator described above and any feature point extraction method can be used so long as the local feature point can be extracted. Then, a predetermined range around the local feature point is divided into 16 blocks of 4×4. Further, a histogram of eight different gradient directions, spaced every 45 degrees, is generated for each block. The 128-dimensional feature vectors are determined as the local feature quantity. Such a local feature quantity is called a scale-invariant feature quantity (SIFT). The feature quantity calculation method is not limited to the above-described method and any feature quantity calculation method can be used so long as the local feature quantity can be calculated.

Further, marker information such as a QR code (registered trademark) or a barcode can be used as identification information of an AR content. If such marker information is used, the amount of data necessary for managing the association of feature information with an AR content can be reduced compared to when the image feature quantity is used.

Figure 4A:
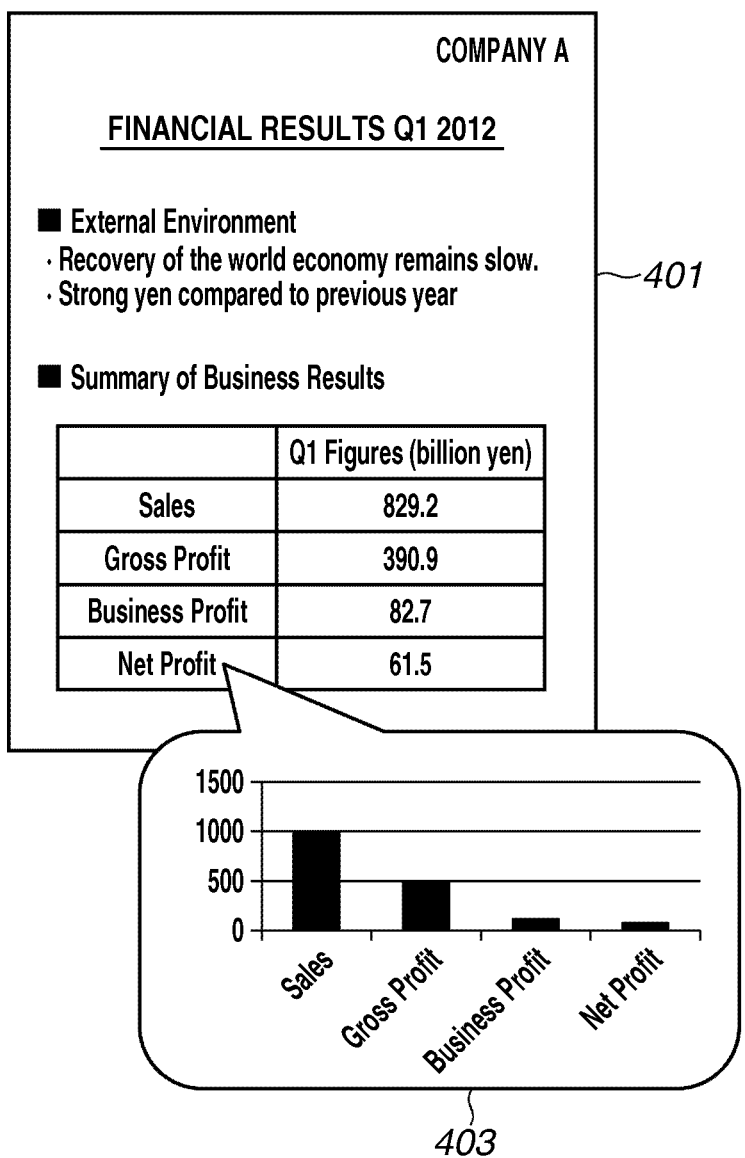
Figure 4B:
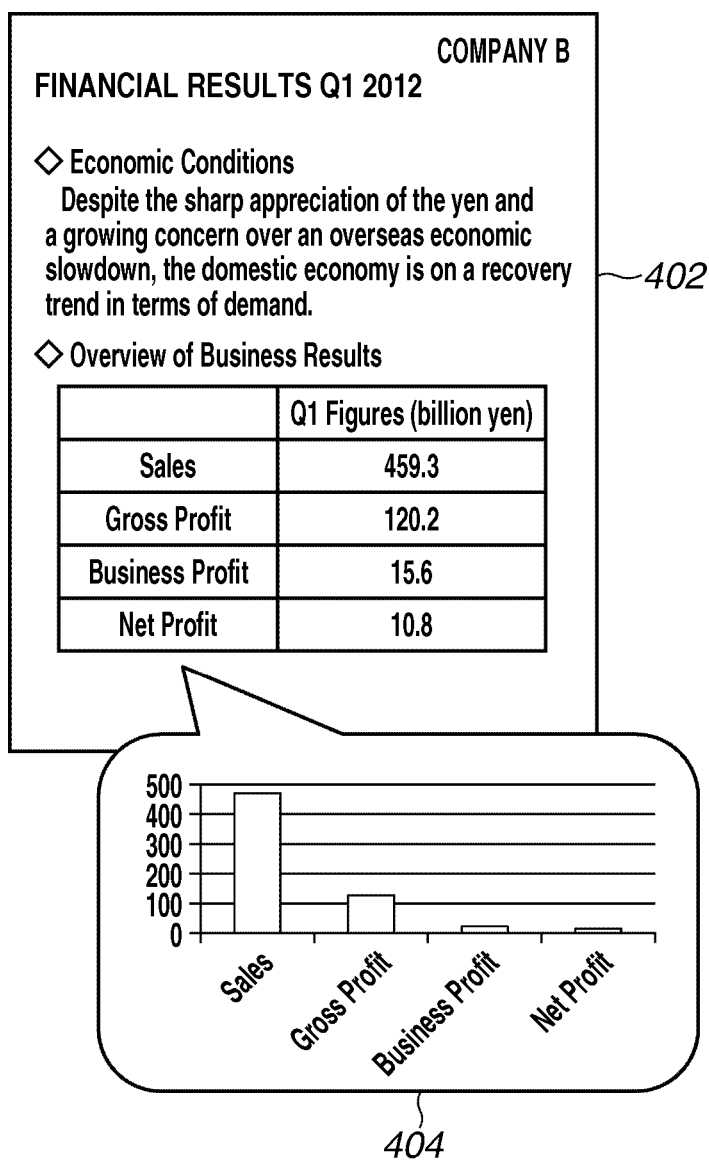

FIGS. 4A, 4B, and 4C illustrate an example of documents embedded with feature information and the corresponding AR contents. FIGS. 4A and 4B illustrate the display of the AR terminal 101 when documents 401 and 402 are separately viewed. The documents 401 and 402 are financial statements of a company A and a company B, respectively. A graph showing the business performance of each company is displayed as the corresponding AR content. More precisely, an AR content 403 is a graph showing the sales, gross profit, business profit, and net profit of the company A. Further, an AR content 404 is a graph showing the sales, gross profit, business profit, and net profit of the company B. FIG. 4C illustrates the display of the AR terminal 101 when the documents 401 and 402 are simultaneously viewed via the AR terminal 101. In the following description, simultaneous viewing indicates a state where the documents 401 and 402 are closely located and both of the documents 401 and 402 are displayed on the screen of the AR terminal 101. In such a state, two pieces of feature information are recognized by the AR terminal 101 or the server 109. An AR content 405 is a graph which is generated so that business performance between the companies A and B can be easily compared. In this example, simultaneous viewing of the documents 401 and 402 allows the user to easily compare business performance between the companies A and B without performing a special operation.

FIGS. 5A, 5B, and 5C illustrate a data format used for the AR contents 403 to 405. By using spreadsheet software, the data in the data format can be changed into the graphs shown in the AR contents 403 to 405. FIGS. 5A and 5B illustrate data corresponding to the AR contents 403 and 404, respectively. More precisely, the data shown in FIGS. 5A and 5B is the sales, gross profit, business profit, and net profit of the companies A and B, respectively and is managed as numerical values. On the other hand, the data format in FIG. 5C illustrates data corresponding to the AR content 405. The data is obtained by adding the sales, gross profits, business profits, and net profits of the companies A and B. The AR content 405 can be easily generated and displayed by using a publicly-known technique used, for example, in spreadsheet software. The AR content 405 is not necessarily stored in advance in the server 109. When the documents 401 and 402 are simultaneously viewed via the AR terminal 101, the AR content 405 can be generated by the server 109 which obtains the AR contents 403 and 404 and the attribute information from the corresponding feature information and then processes the AR contents 403 and 404 based on the obtained attribute information.

Figure 6A:
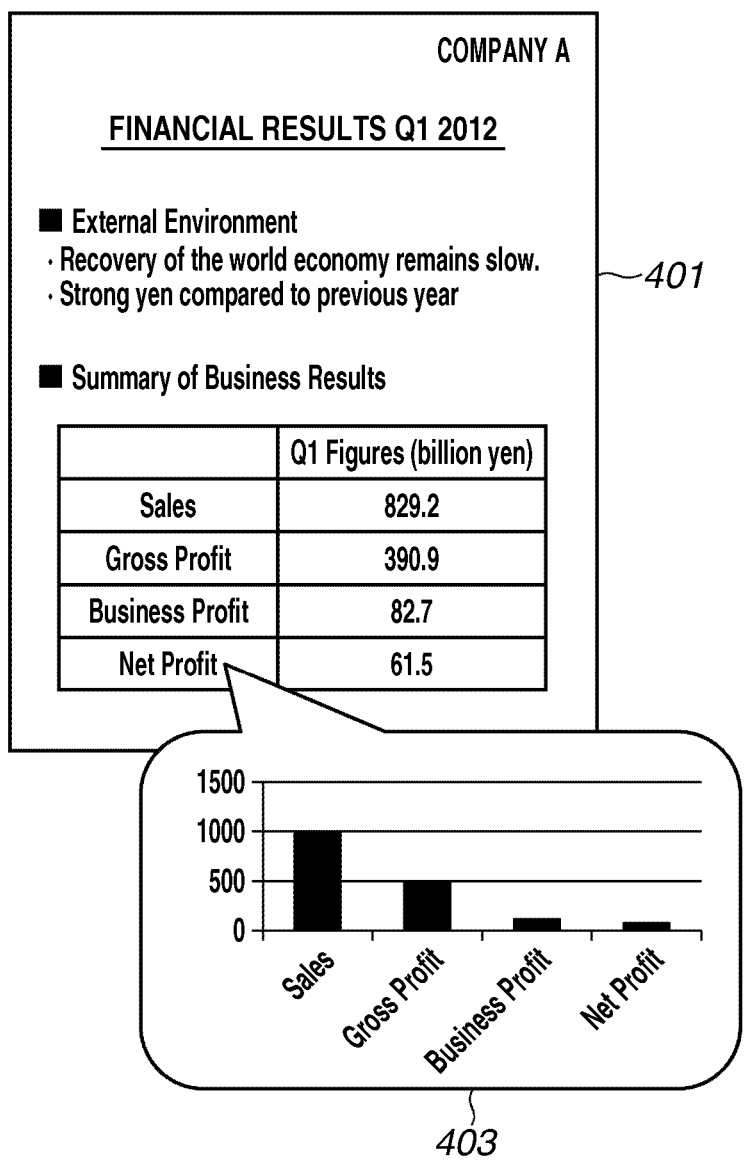
FIGS. 6A, 6B, and 6C are schematic diagrams of AR content processing according to the first exemplary embodiment.
Figure 6B:
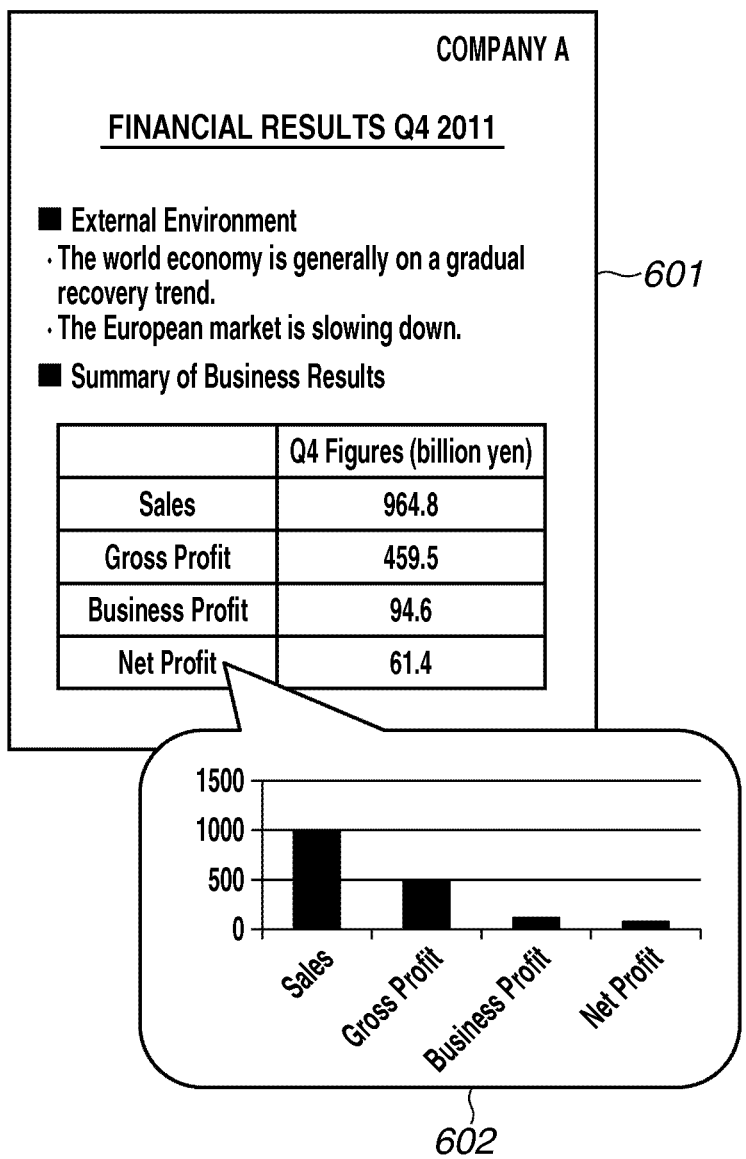
Figure 6C:
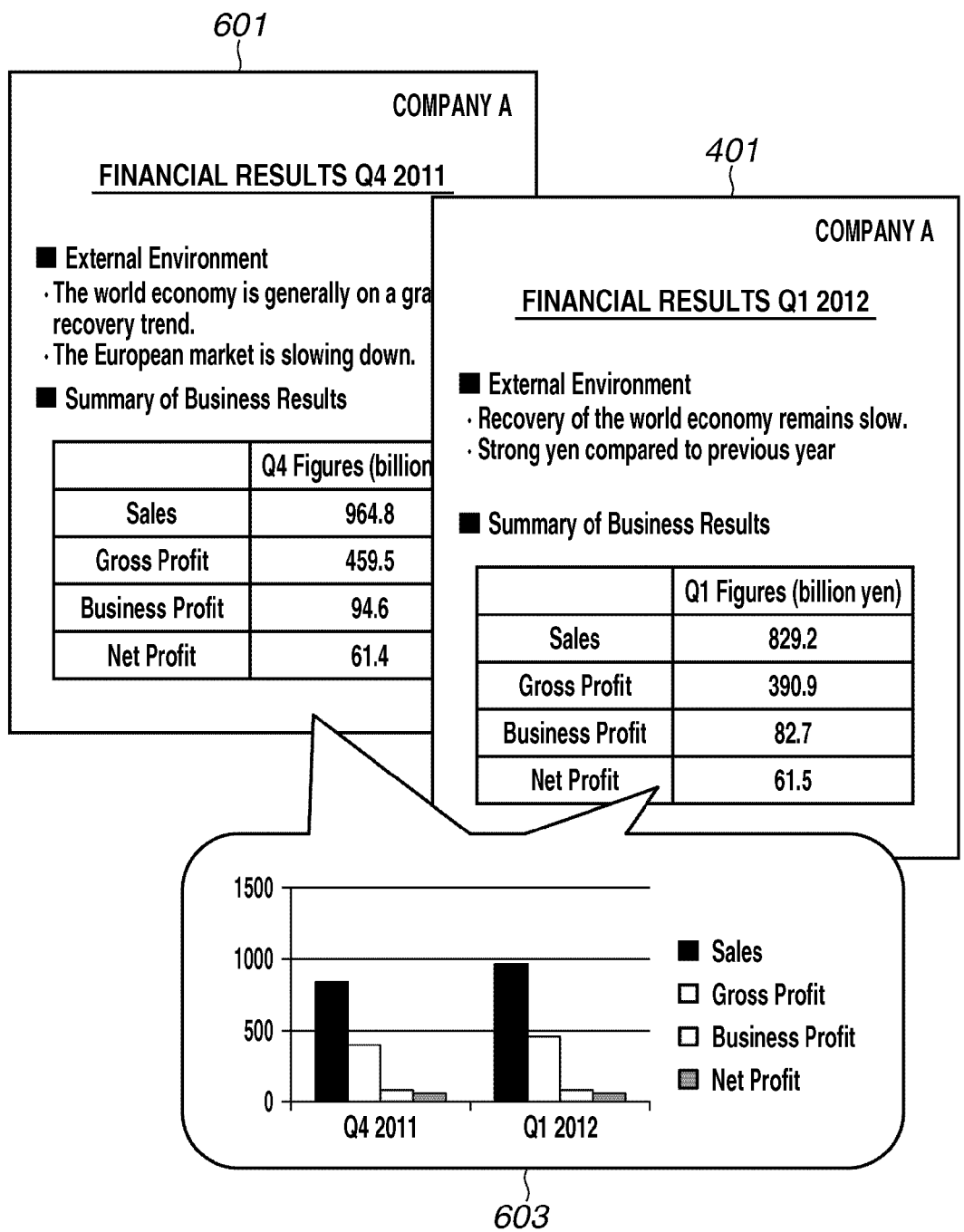

FIGS. 6A, 6B, and 6C illustrate another example of documents embedded with feature information and the corresponding AR contents. FIGS. 6A and 6B illustrate the display of the AR terminal 101 when the document 401 and a document 601 are separately viewed via the AR terminal 101. The documents 401 and 601 are the financial statements of the first quarter of the year 2012 and the fourth quarter of the year 2011 of the company A, respectively. As an AR content corresponding to each of the documents 401 and 601, business performance for each of the quarters is displayed by a graph. The AR content 403 shows the sales, gross profit, business profit, and net profit for the first quarter of the year 2012. An AR content 602 shows the sales, gross profit, business profit, and net profit for the fourth quarter of the year 2011. FIG. 6C illustrates the display of the AR terminal 101 when the documents 401 and 601 are simultaneously viewed via the AR terminal 101. An AR content 603 is a graph which is generated so that the difference in the business performance between the first quarter of the year 2012 and the fourth quarter of the year 2011 can be easily compared. A data format similar to the one used in FIGS. 5A, 5B, and 5C can be used for the AR contents 602 and 603. The data can be easily displayed in a graph format by applying a publicly-known technique used in spreadsheet software. In the example illustrated in FIG. 6C, simultaneous viewing of the documents 401 and 601 allows the user to easily understand the change in the business performance without performing a special operation.

Figure 11A:
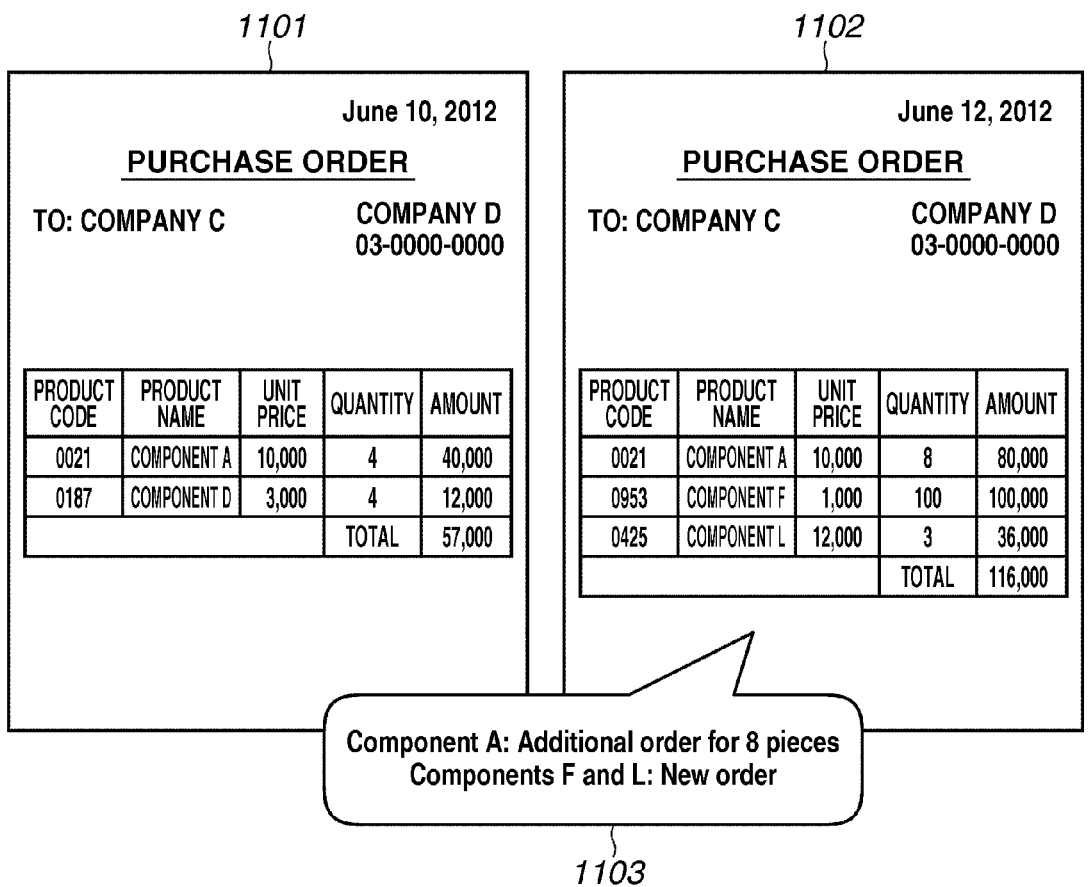
FIGS. 11A and 11B are schematic diagrams of content processing according to the second exemplary embodiment.
Figure 11B:
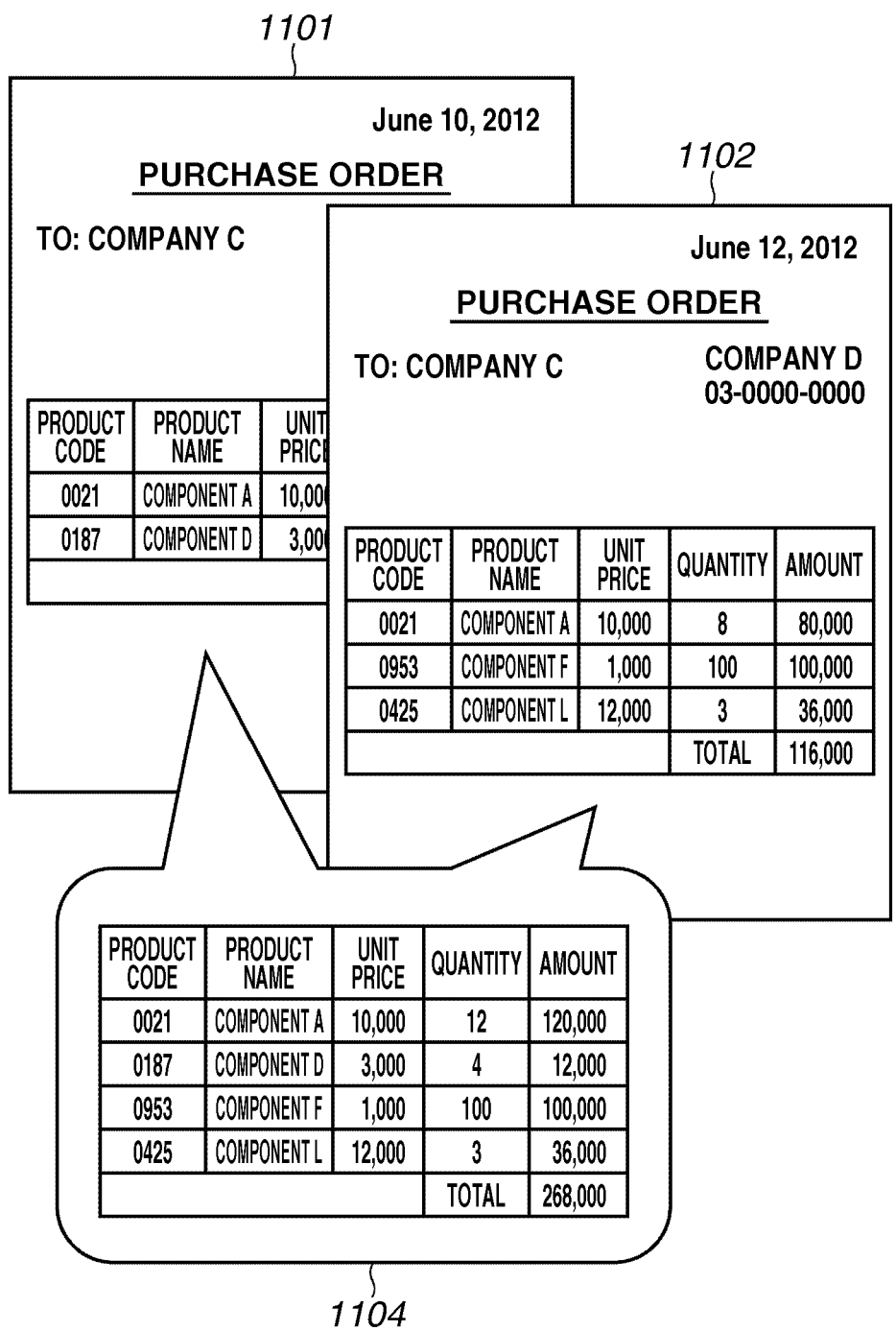

In addition to the examples illustrated in FIGS. 4A to 4C and FIGS. 6A to 6C, there is a case where difference information between AR contents can be generated. For example, if a document with an older date and a document with a newer date are identified according to the attribute information, difference information between the AR contents corresponding to the documents can be generated. Such an example is illustrated in FIGS. 11A and 11B using a document 1101 and a document 1102.

Further, a single document is not necessarily associated with a single piece of feature information. For example, a plurality of pieces of feature information which corresponds to augmented information may exist in a single document.

The above-described operation will now be described with reference to a flowchart.

Figure 7:
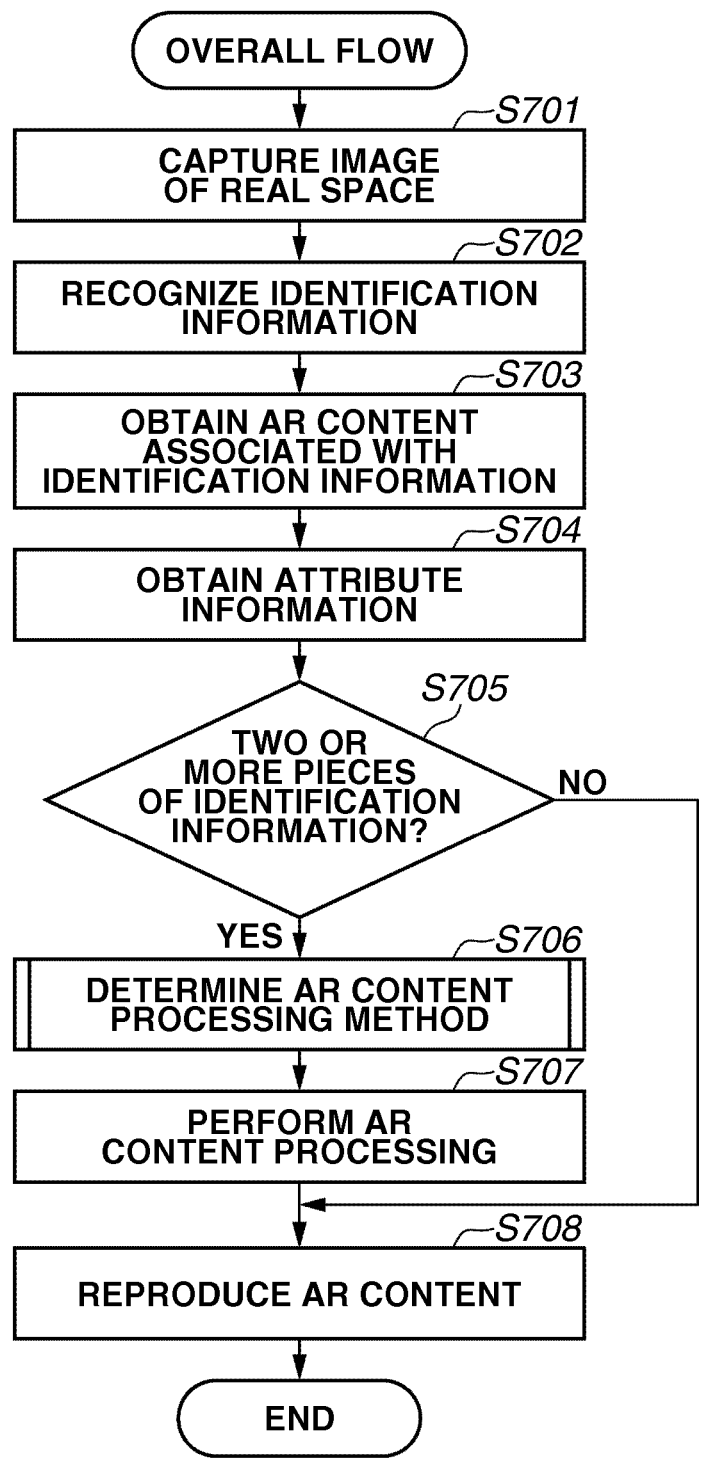
FIG. 7 is a flowchart illustrating entire processing according to the first exemplary embodiment.

FIG. 7 is a flowchart illustrating the processing performed by the units (the imaging unit 115 to the content reproduction unit 122) according to the present embodiment. In step S701, the image capturing unit 105 of the AR terminal 101 captures an image of real space. In step S702, the recognition unit 116 recognizes identification information used for identifying the AR content by using the image captured in step S701.

Although an image feature quantity is used as the identification information according to the present embodiment, a dedicated marker can be used in place of the image feature quantity. Further, the recognition unit 116 may be either on the side of the server 109 or the side of the AR terminal 101. The above-described SIFT and the feature information obtained from a dedicated marker is used as the identification information used for identifying the AR content.

In step S703, the content acquisition unit 117 obtains the AR content associated with the identification information recognized in step S702. In this step, the content acquisition unit 117 acquires the AR content from the identification information by referencing the data 301 illustrated in FIG. 3A. In step S704, the attribute information acquisition unit 118 obtains attribute information associated with the identification information recognized in step S702. In this step, as is performed in step S702, the attribute information acquisition unit 118 obtains the attribute information from the identification information by referencing the data 301 illustrated in FIG. 3A. Although the attribute information is described as being associated with the identification information, the attribute information can be associated with the AR content in place of the identification information. With this configuration, if a same AR content is associated with a plurality of pieces of identification information, the amount of data necessary for managing the association can be reduced. For example, in a case where a same AR content A is associated with each of three image feature quantities in the data format illustrated in FIG. 3B, then it is necessary to redundantly store three pieces of the same attribute information if the attribute information is associated with the identification information. However, if the attribute information is associated with the AR content and if the association is managed by a different table, it is not necessary to redundantly store the same attribute information.

In step S705, whether two or more pieces of identification information have been recognized in step S702 is determined. If only one piece of identification information is recognized (NO in step S705), the processing proceeds to step S708. In step S708, the content reproduction unit 122 reproduces the AR content obtained in step S703 without being processed. On the other hand, if two or more pieces of identification information is recognized (YES in step S705), the processing proceeds to step S706. In step S706, the content processing method determination unit 119 determines the AR content processing method to be used for processing the AR content obtained in step S703. Details of the processing in this step will be described with reference to FIG. 8. In step S707, the content processing unit 121 processes the AR content using the processing determined in step S706. Lastly, in step S708, the content reproduction unit 122 reproduces the AR content processed in step S707.

Figure 8:
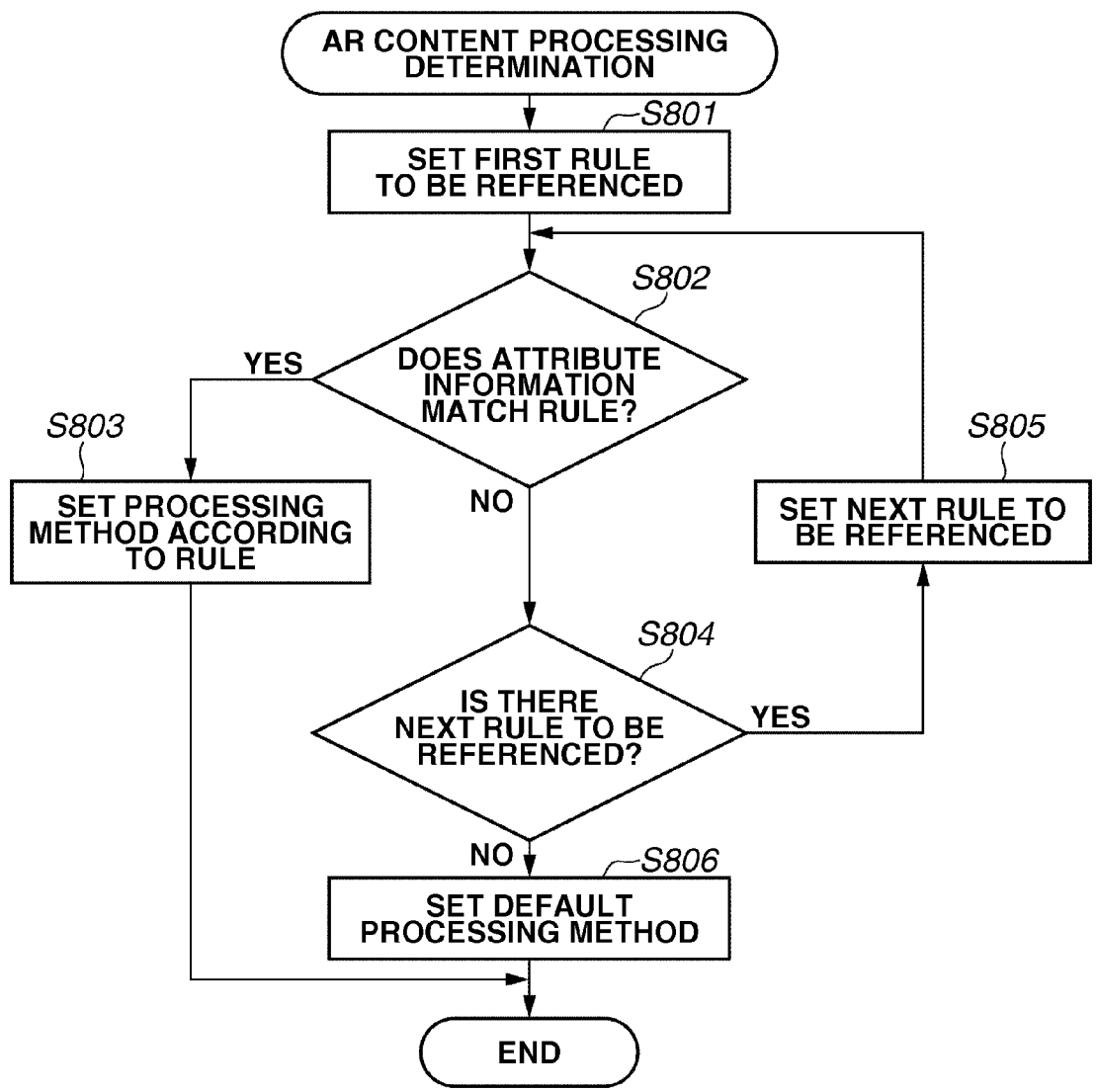
FIG. 8 is a flowchart illustrating content processing determination according to the first exemplary embodiment.

FIG. 8 is a flowchart illustrating detailed processing of step S706 in FIG. 7. The content processing method determination unit 119 determines the content processing method according to a combination of the attribute information while referencing the content processing rule 303 illustrated in FIG. 3C. The content processing method determination unit 119 sequentially checks each rule in the content processing rule 303 to determine whether the attribute information matches the rule. A rule to be used can be selected in advance according to category information in the attribute information.

In step S801, the content processing method determination unit 119 sets the first rule to be referenced. In step S802, the content processing method determination unit 119 determines whether the attribute information obtained in step S704 matches the rule which has been set. For example, the rule may be "The attribute information corresponding to two pieces of identification information both have "financial results" as category information as well as a same company name as company information". If the attribute information is determined as matching the rule (YES in step S802), the processing proceeds to step S803. In step S803, the content processing method determination unit 119 sets the processing method of the AR content according to the rule. For example, processing such as "combine graphs in two AR contents and generate a year-by-year graph" can be set.

On the other hand, in step S802, if the attribute information is determined as not matching the rule (NO in step S802), the processing proceeds to step S804. In step S804, the content processing method determination unit 119 determines whether there is a next rule to be referenced. If there is no such rule (NO in step S804), the processing proceeds to step S806. In step S806, the content processing method determination unit 119 sets the default processing as the processing to be used. Then, the processing ends. As the default processing, the content processing method determination unit 119 can set processing such as "perform no processing". On the other hand, in step S804, if there is a next rule to be referenced (YES in step S804), the processing proceeds to step S805. In step S805, the content processing method determination unit 119 sets the next rule to be referenced. Then, the processing returns to step S802.

According to the present embodiment, the rule storage unit 120 stores the content processing method according to a combination of attribute information. However, the rule may be dynamically generated according to machine learning or a data mining method.

If the rule is to be dynamically generated, data on AR contents, attribute information corresponding to the AR contents, and the operations performed by the user are collected. The user operations include, for example, providing an instruction to combine contents or obtain a difference between the contents. Then, a cluster analysis or an analysis using a support vector machine is performed for a certain number of data sets. For example, attribute information can be treated as multivariate data and a plurality of pieces of similar attribute information can be grouped. Further, the frequency of user operations is calculated for each group of attribute information, and the operation with the highest frequency is extracted as a rule to be used. In this manner, using a method such as machine learning allows AR contents to be processed without manually generating a rule in advance.

Further, the content processing rule 303 may include rules other than combining AR contents and generating and displaying a graph. For example, a rule by which data with the highest numerical value is highlighted after a comparison among a plurality of AR contents can be employed. The highlighting is, for example, boldfacing, placing a mark such as an asterisk, or changing colors.

According to the present embodiment, when a plurality of documents is simultaneously viewed, an AR content different from the one displayed when each of the documents is separately viewed can be reproduced. For example, according to a relationship between the documents, two or more AR contents can be combined and a different AR content can be displayed. This can be realized because the relationship between the documents is determined based on a combination of the attribute information obtained from the AR markers or image features embedded in the documents. In such a manner, simply viewing two or more documents at the same time allows the user to view an AR content that is processed according to the relationship between the documents. The present embodiment can be applied to objects other than documents.

For example, the present embodiment can be applied to products in general, objects to which an AR marker can be added, and objects from which an image feature can be extracted.

Next, a second exemplary embodiment of the present invention will be described. Note that a description of configurations similar to those of the first exemplary embodiment is omitted.

In the first exemplary embodiment, when the AR terminal 101 or the server 109 recognizes two or more pieces of feature information, AR contents are processed based on a combination of attribute information associated with either the feature information or the AR contents. According to the present embodiment, AR contents are processed according to a positional relationship between two or more pieces of feature information in place of attribute information.

Figure 9:
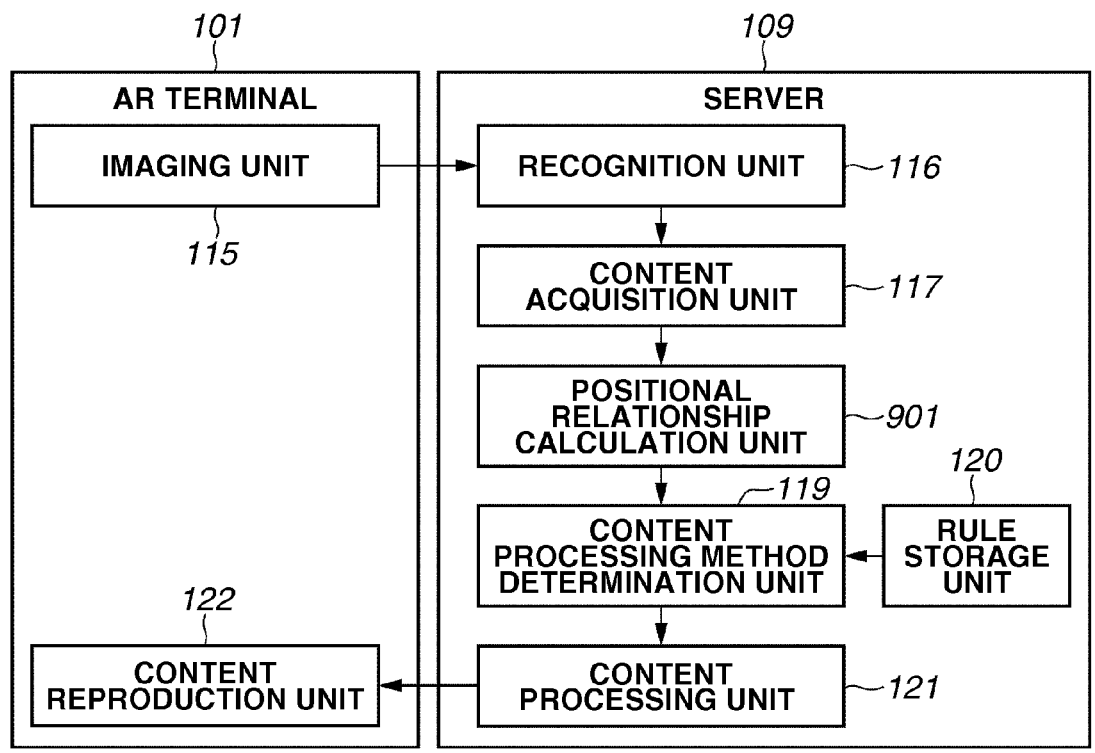
FIG. 9 illustrates a configuration of a system according to a second exemplary embodiment of the present invention.

FIG. 9 illustrates the configuration of the data processing portions of the augmented reality system according to the present embodiment. The imaging unit 115 of the AR terminal 101 captures an image or a video of real space and transmits the captured image or video to the server 109. Then, the content reproduction unit 122 obtains an AR content to be superimposed on the captured image or video from the server 109 and displays the AR content on the display unit 107.

The server 109 provides an augmented reality content to the AR terminal 101 according to the captured image or video received. First, the recognition unit 116 analyzes the received image or video and recognizes feature information such as an AR marker or an image feature. Although the recognition unit 116 is included in the server 109 in FIG. 9, the recognition unit 116 can be included in the AR terminal 101. The feature information is identification information used for identifying the corresponding AR contents.

The content acquisition unit 117 acquires the AR contents associated with the identification information. Next, a positional relationship calculation unit 901 calculates a positional relationship between the identification information recognized by the recognition unit 116 by using the positions from which the feature information is extracted. The server 109 includes the rule storage unit 120 which defines a content processing method according to the positional relationship between the identification information. According to a rule stored in the rule storage unit 120, the content processing method determination unit 119 determines the processing method and the content processing unit 121 processes the content using the determined processing method. The processed content is sent to the AR terminal 101. The content reproduction unit 122 of the AR terminal 101 displays the AR content sent from the server 109 on the display unit 107.

FIG. 10 illustrates a content processing rule 1001 used by the system according to the present embodiment. The content processing rule 1001 is definition information which defines the processing of AR contents according to the positional relationship between the identification information calculated by the positional relationship calculation unit 901. According to the example described below, the content processing rule 1001 defines a rule to determine whether a difference between two AR contents is to be obtained or the two AR contents are to be combined, depending on whether two pieces of identification information are arranged side-by-side or one piece of identification information is superimposed on the other. Further, the content processing rule 1001 defines a rule by which if one of two pieces of identification information is skewed, only the AR content corresponding to the identification information which is aligned is to be displayed. Additionally, a rule which defines that "if a distance between two pieces of identification information is small, the AR contents are combined, and if the distance is great, the AR contents are not combined and each of the AR contents is separately displayed" can be set. Whether the distance is small or great can be determined by an absolute value but may also be determined according to a relative value such as a value equal to or less than 70% of the width of the image capturing region. The content processing rule 1001 is managed by the rule storage unit 120.

FIGS. 11A and 11B illustrate an example of documents embedded with feature information and the corresponding AR contents. FIG. 11A illustrates the display of the AR terminal 101 when the documents 1101 and 1102 are arranged side-by-side and viewed from a close distance. The documents 1101 and 1102 are purchase orders with different order dates. An AR content 1103 displays the difference in the order items between the documents 1101 and 1102. Although not illustrated, when the documents 1101 and 1102 are separately viewed via the AR terminal 101, the order in each of the documents 1101 and 1102 is displayed as the AR content.

FIG. 11B illustrates the display of the AR terminal 101 when the documents 1101 and 1102 are viewed via the AR terminal 101 with the document 1102 superimposed on the document 1101. An AR content 1104 displays information about a total of ordered items in the documents 1101 and 1102. In such a manner, changing a positional relationship between two purchase orders allows the user to view a difference between or a total of the two purchase orders. When difference information is to be generated, a rule that defines "if difference information is to be generated, the information is generated by subtracting the data of the AR content of the document 1101 from the data of the AR content of the document 1102 which is superimposed on the document 1101" may be stored in the rule storage unit 120.

The calculation method for determining whether the documents are arranged side-by-side or one document is superimposed on the other can be obtained, for example, by applying a publicly-known image processing technique to a captured image of the documents. For example, whether there is a missing image feature quantity, or an edge detection result can be used. A missing image feature quantity indicates that one document is covered by the other document. Thus, it is considered that one document is superimposed on the other. Further, according to the edge detection, a boundary of the documents can be obtained. If a discontinuous document edge is obtained, it is considered that one document is superimposed on the other.

FIGS. 12A and 12B illustrate examples of a data format used for an AR content corresponding to the order in each of the documents 1101 and 1102. Each of the product code, product name, unit price, quantity, and amount which correspond to each purchase order is managed as numerical data. A difference between or a total of the two purchase orders can be easily calculated by applying a publicly-known technique used in spreadsheet software.

Figure 13:
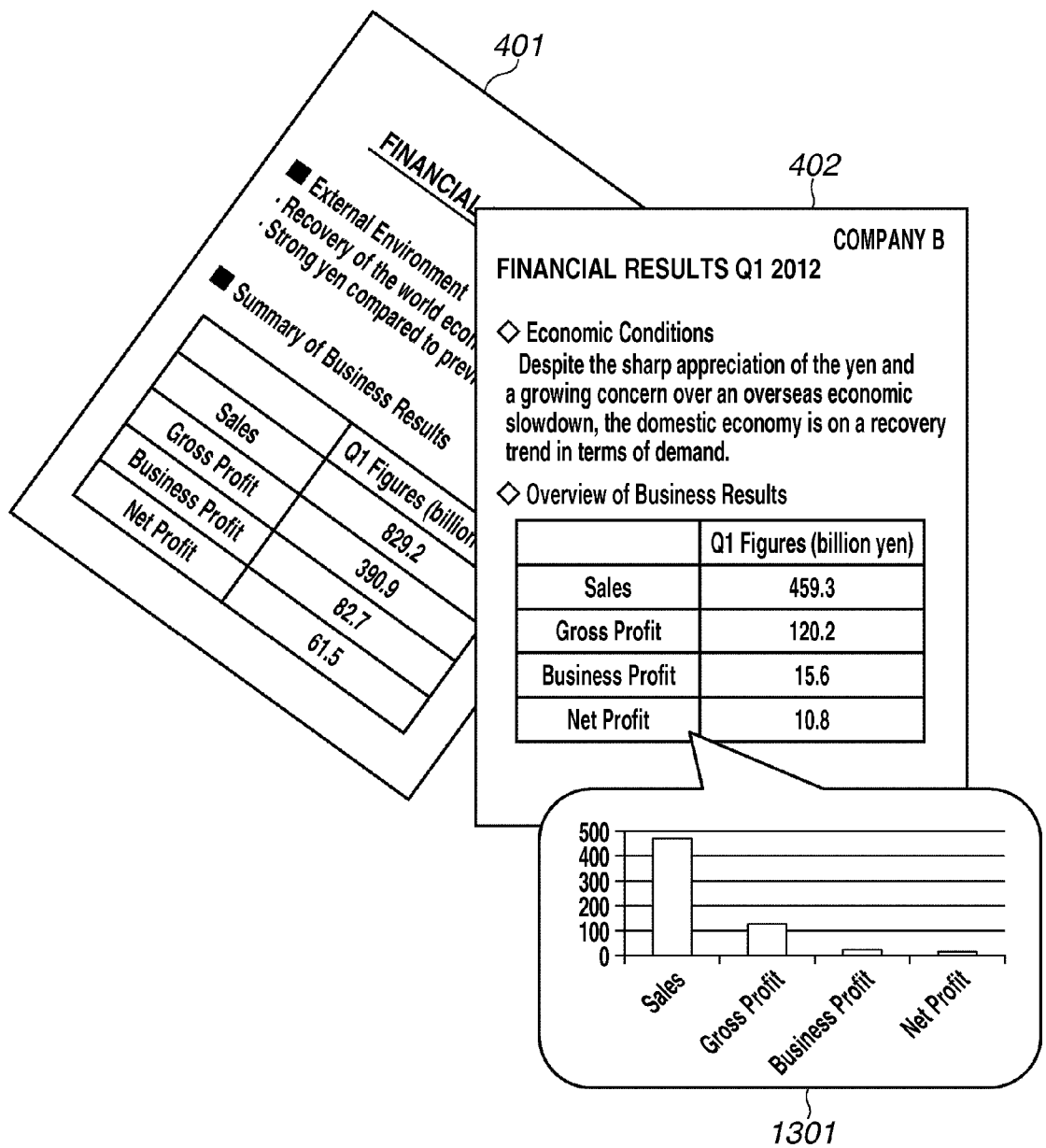
FIG. 13 is a schematic diagram of AR content processing according to the second exemplary embodiment.

FIG. 13 illustrates another example of documents embedded with feature information and the corresponding AR content according to the present embodiment. In FIG. 13, as illustrated in FIG. 4C, the documents 401 and 402 in FIGS. 4A and 4B are simultaneously viewed from a close distance via the AR terminal 101. However, unlike FIG. 4C, the document 401 is greatly skewed. In FIG. 13, the same AR content as the one reproduced when the document 402 alone is viewed is reproduced as an AR content 1301.

In such a manner, if one of two documents is greatly skewed, it is considered that the user has no intention to reference the document and the AR terminal 101 displays only the AR content of the other unskewed document. The skew of the document can be calculated based on, for example, an edge detection result. The edge detection result is obtained by applying a publicly-known image processing technique to a captured image of the documents. According to the edge detection, the boundary of the documents can be obtained. Whether the edge is skewed can be used for determining the skew of the documents.

The above-described operation will now be described with reference to a flowchart.

Figure 14:
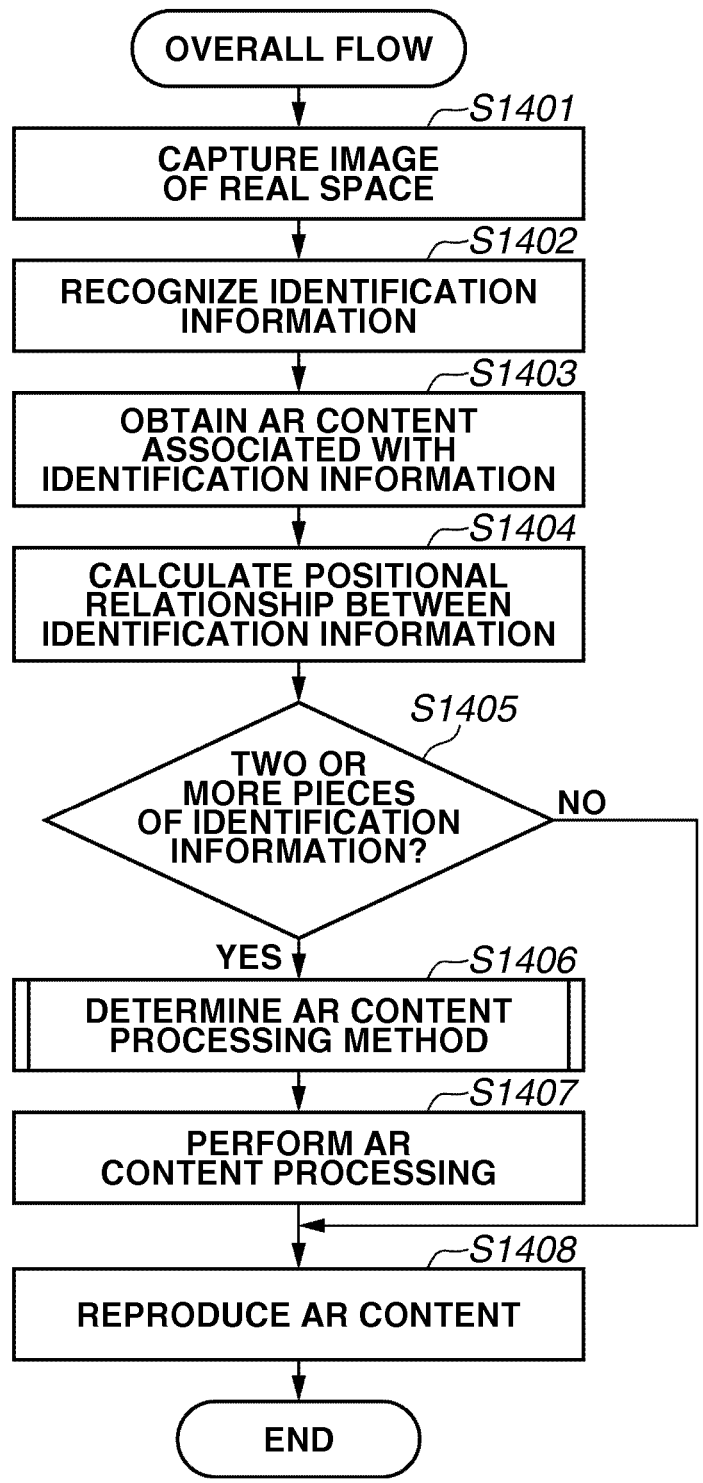
FIG. 14 is a flowchart illustrating the entire processing according to the second exemplary embodiment.

FIG. 14 is a flowchart illustrating the processing performed by the units (the imaging unit 115 to the content reproduction unit 122) according to the present embodiment. In step S1401, the image capturing unit 105 captures an image of real space. In step S1402, the recognition unit 116 recognizes identification information used for identifying the AR content by using the image captured in step S1401. Further, the recognition unit 116 may be either on the side of the server 109 or the side of the AR terminal 101. The above-described SIFT and the feature information obtained from a dedicated marker is used as identification information used for identifying the AR content.

In step S1403, the content acquisition unit 117 obtains the AR content associated with the identification information recognized in step S1402. In this step, the content acquisition unit 117 acquires the AR content from the identification information by referencing the data 302 illustrated in FIG. 3B. In step S1404, the positional relationship calculation unit 901 calculates the positional relationship between the identification information recognized in step S1402. For example, in which direction the two pieces of identification information is arranged, how far the information is apart, whether one piece of information is superimposed on the other, and whether the information is skewed can be calculated as the positional relationship.

In step S1405, whether two or more pieces of identification information have been recognized in step S1402 is determined. If only one piece of identification information is recognized (NO in step S1405), the processing proceeds to step S1408. In step S708, the content reproduction unit 122 reproduces the AR content obtained in step S1403 without being processed. On the other hand, if two or more pieces of identification information is recognized (YES in step S1405), the processing proceeds to step S1406. In step S1406, the content processing method determination unit 119 determines the AR content processing method to be used for processing the AR content obtained in step S1403. Details of the processing in this step are described above with reference to FIG. 8. In step S1407, the content processing unit 121 processes the AR content using the processing determined in step S1406. Lastly, in step S1408, the content reproduction unit 122 reproduces the AR content processed in step S1407.

According to the present embodiment, an AR content can be displayed according to a positional relationship between documents. For example, a different AR content can be reproduced, depending on whether the user views two documents being arranged side-by-side or one document being superimposed on the other. This is because the positional relationship between the documents is determined according to the positional relationship between the AR markers or image feature quantities embedded in the documents. Accordingly, the content to be displayed can be changed by an intuitive operation such as changing the arrangement of the documents. The present embodiment can be applied to objects other than documents.

For example, the present embodiment can be applied to products in general, objects to which an AR marker can be added and objects from which an image feature can be extracted.

Next, a third exemplary embodiment of the present invention will be described. According to the present embodiment, a variation of the processing described in the first exemplary embodiment will be described. Note that a description of configurations similar to those of the first exemplary embodiment is omitted.

FIG. 15 illustrates a content processing rule 1501 of the system. The content processing rule 1501 is definition information which defines how to process an AR content according to a combination of attribute information. In the example described below, a rule by which an AR content to be reproduced is changed according to a combination of attribute information is set. The content processing rule 1501 is managed by the rule storage unit 120.

Figure 16A:
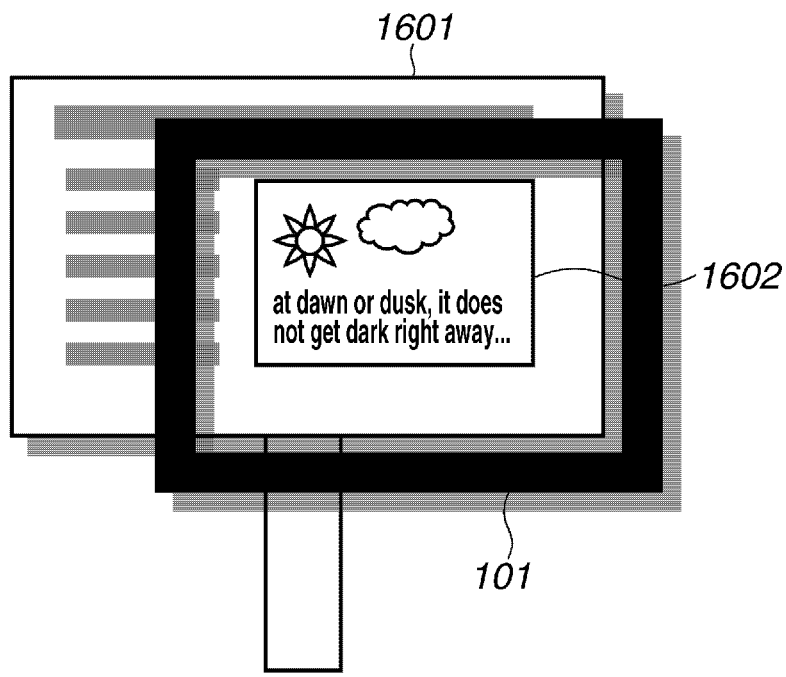
FIGS. 16A and 16B are schematic diagrams of AR content processing according to the third exemplary embodiment.
Figure 16B:
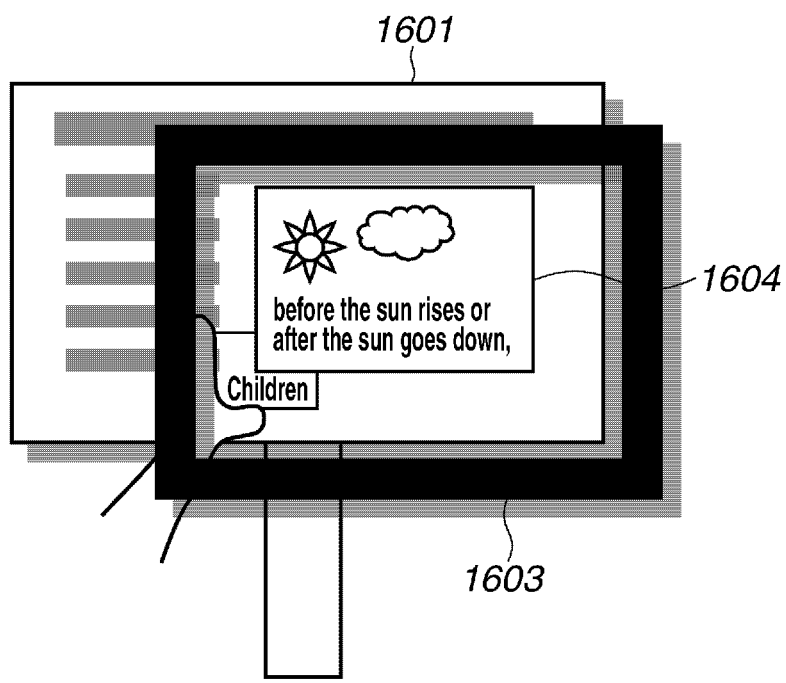

FIGS. 16A and 16B illustrate concrete examples of an explanation board embedded with feature information and the corresponding AR content. FIG. 16A illustrates the display of the AR terminal 101 when an explanation board 1601 is viewed via the AR terminal 101. In FIG. 16A, an AR content 1602, which is a description video, is displayed as an AR content that corresponds to the explanation board 1601. On the other hand, FIG. 16B illustrates the display of the AR terminal 101 when the explanation board 1601 and a children's ticket 1603 are simultaneously viewed via the AR terminal 101. An AR content 1604 is a video for children that corresponds to the AR content 1602. In this example, the user can view the video for children without performing a special operation by simultaneously viewing the explanation board 1601 and the children's ticket 1603. Although the video for children (the AR content 1604) can be prepared in advance as a content different from the normal video (the AR content 1602), the video for children can be automatically generated by applying a kanji-to-kana conversion technique to the normal video. The technique to be applied is not limited to the kanji-to-kana conversion technique. For example, a video for foreign people can be generated by using a translation technique. In such a manner, when a video is dynamically generated, it is not necessary to prepare various videos in advance. Accordingly, the amount of data to be managed can be reduced.

According to the present embodiment, the AR content to be reproduced can be switched to a different content according to a combination of attribute information. In addition to the case described above, a content can be reproduced based on a combination of a document and an ID card, which can be used for security protection. The present embodiment can be applied to objects other than documents.

For example, the present embodiment can be applied to products in general, objects to which an AR marker can be added, and objects from which an image feature can be extracted.

Next, a fourth exemplary embodiment of the present invention will be described. According to the present embodiment, a variation of the processing described in the second exemplary embodiment will be described. Note that a description of configurations similar to those of the second exemplary embodiment is omitted.

FIG. 17 illustrates a content processing rule 1701 used by a system according to the present embodiment. The content processing rule 1701 is definition information which defines how to process an AR content according to a positional relationship between the identification information calculated by the positional relationship calculation unit 901. In the example described below, there is a rule by which whether the AR content is to be highlighted or zoomed out is determined according to a positional relationship between the identification information (whether one piece of identification information is superimposed on the other). The content processing rule 1701 is stored in the rule storage unit 120.

Figure 18:
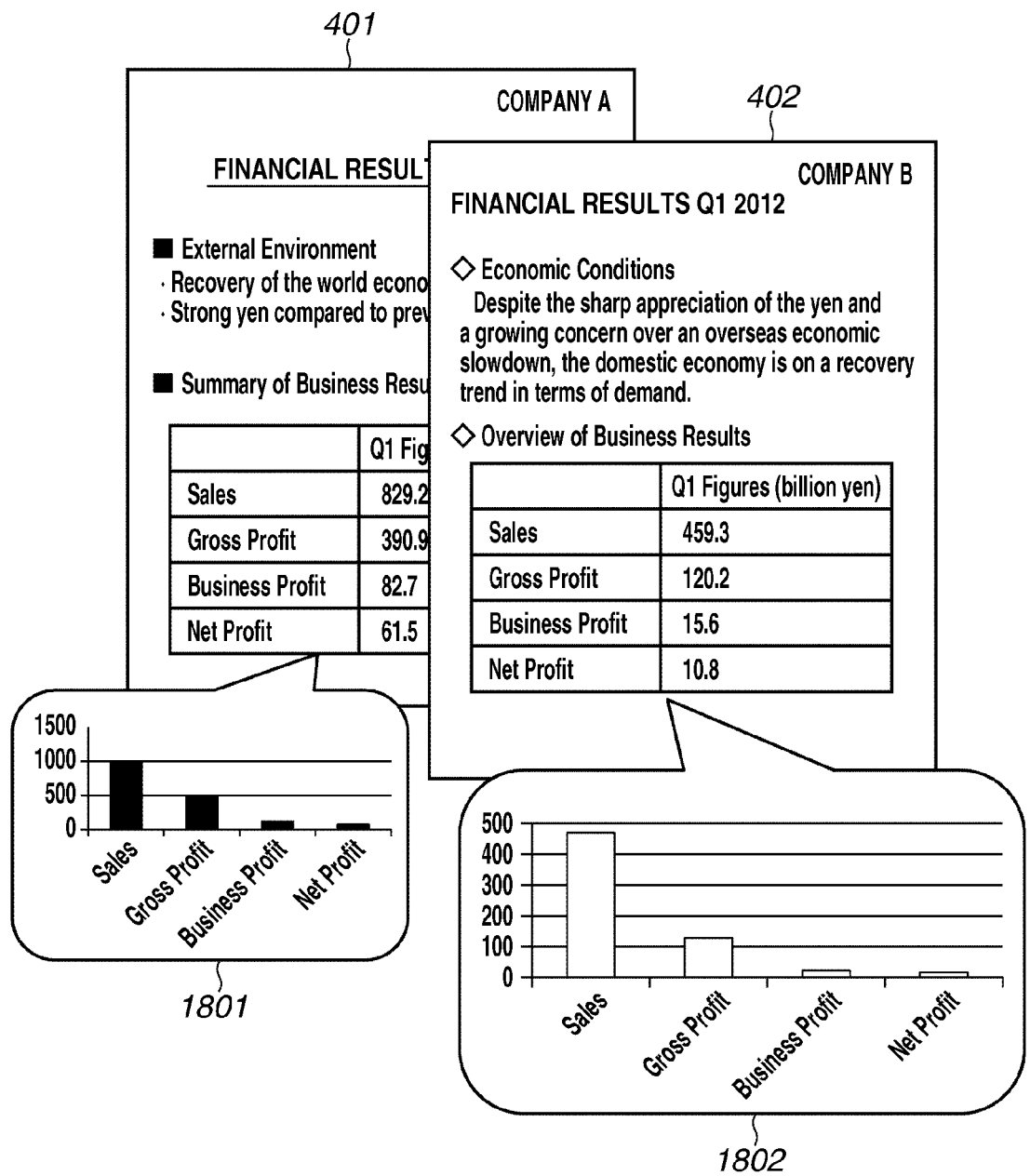
FIG. 18 is a schematic diagram of AR content processing according to the fourth exemplary embodiment.

FIG. 18 illustrates a concrete example of AR contents when the content processing rule 1701 is applied to the documents 401 and 402 embedded with identification information that are illustrated in FIGS. 4A, 4B, and 4C. In FIG. 18, the document 402 is superimposed on the document 401. An AR content 1801 is a zoomed out version of the AR content 403 and an AR content 1802 is a highlighted version of the AR content 404. As a method for determining a positional relationship between the documents (whether one document is superimposed on the other), for example, whether there is a missing image feature quantity in a captured image of the documents or an edge detection result can be used. Highlighting or zooming out of an AR content can be realized by an image conversion processing according to a publicly-known image processing technique.

According to the present embodiment, an AR content can be zoomed in or out according to a positional relationship between identification information. For example, when a plurality of documents is viewed, the AR content of the uppermost document can be zoomed in. The present embodiment can be applied to objects other than documents.

For example, the present embodiment can be applied to products in general, objects to which an AR marker can be added, and objects from which an image feature can be extracted.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the exemplary embodiments of the present invention, if two or more pieces of feature information that indicate association of augment d information exist in a captured image of objects in real space, a new piece of augmented information can be flexibly generated by using the plurality pieces of augmented information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-258557 filed Nov. 27, 2012, which is hereby incorporated by reference herein in its entirety.

What is claimed is:

1. An image processing apparatus connectable via a network to a terminal which captures an image, the image processing apparatus comprising:
   an acquisition unit configured to acquire, from feature information extracted from a captured image, augmented information and attribute information which are related to the feature information;
   a processing unit configured to generate, if a plurality of pieces of the feature information is extracted, at least one piece of new augmented information by using a plurality of pieces of the augmented information acquired by the acquisition unit, based on satisfying a condition using a combination of the attribute information; and
   a transmission unit configured to transmit, if a plurality of pieces of the feature information is extracted, the new augmented information generated by the processing unit to the terminal and to transmit, if one piece of the feature information is extracted, the augmented information related to the one piece of the feature information to the terminal.

2. The image processing apparatus according to claim 1, wherein each piece of the feature information is associated with each document, and
   wherein the acquisition unit acquires attribute information of the document from the feature information.

3. The image processing apparatus according to claim 1, wherein the attribute information is associated with the augmented information, and
   wherein the acquisition unit acquires the attribute information corresponding to the augmented information.

4. The image processing apparatus according to claim 1, further comprising:
   a storage unit configured to store definition information of a condition of generation processing of the new augmented information according to a combination of the attribute information,
   wherein the processing unit performs processing by referencing the definition information.

5. The image processing apparatus according to claim 4, wherein if an instruction for processing the augmented information is provided via the terminal, the storage unit stores the definition information generated through learning the instruction for processing.

6. The image processing apparatus according to claim 4, wherein the storage unit stores the definition information using structured data.

7. The image processing apparatus according to claim 4, wherein the processing unit generates at least one piece of new augmented information by using the plurality of pieces of augmented information, based on definition information of a category selected according to the attribute information indicating the category of the augmented information.

8. The image processing apparatus according to claim 1, wherein the processing unit performs processing by combining the plurality of pieces of the acquired augmented information.

9. The image processing apparatus according to claim 1, wherein the processing unit performs processing by generating difference information between the plurality of pieces of the acquired augmented information.

10. The image processing apparatus according to claim 1, wherein the processing unit performs processing by highlighting at least one piece of the acquired augmented information.

11. The image processing apparatus according to claim 1, wherein the feature information is a marker.

12. The image processing apparatus according to claim 1, wherein the feature information is a QR Code®.

13. The image processing apparatus according to claim 1, wherein the feature information is an image feature quantity.

14. The image processing apparatus according to claim 13, wherein the image feature quantity is a scale-invariant feature transform (SIFT).

15. An image processing apparatus connectable via a network to a terminal which captures an image, the image processing apparatus comprising:
    an acquisition unit configured to acquire, from feature information extracted from a captured image, augmented information which is related to the feature information;
    a processing unit configured to generate, if a plurality of pieces of the feature information is extracted, at least one piece of new augmented information by using a plurality of pieces of the augmented information acquired by the acquisition unit, based on a positional relationship between the extracted pieces of the feature information; and
    a transmission unit configured to transmit, if a plurality of pieces of the feature information is extracted, the new augmented information generated by the processing unit to the terminal and to transmit, if one piece of the feature information is extracted, the augmented information related to the one piece of the feature information to the terminal.

16. The image processing apparatus according to claim 15, further comprising:
    a storage unit configured to store definition information of a condition of generation processing of the new augmented information according to the positional relationship,
    wherein the processing unit performs processing by referencing the definition information.

17. The image processing apparatus according to claim 16, wherein the storage unit stores the definition information using structured data.

18. The image processing apparatus according to claim 15, wherein the processing unit processes the acquired augmented information according to a distance between positions from which the feature information has been extracted.

19. An image processing apparatus according to claim 15, further comprising:
    a determination unit configured to determine a skew of the feature information,
    wherein if at least one of the plurality pieces of feature information is skewed, the processing unit does not use augmented information acquired from the feature information determined to be skewed and the processing unit uses augmented information acquired from the feature information determined not to be skewed.

20. An image processing method of an image processing apparatus connectable to a terminal which captures an image, the image processing method comprising:
    acquiring, at an image processing apparatus, augmented information and attribute information, which are related to feature information extracted from a captured image;
    if a plurality of pieces of the feature information is extracted, generating, at the image processing apparatus, at least one piece of new augmented information by using a plurality of pieces of the acquired augmented information, based on satisfying a condition using a combination of the attribute information;
    transmitting, if a plurality of pieces of the feature information is extracted, the generated new augmented information from the image processing apparatus to the terminal; and
    transmitting, if one piece of the feature information is extracted, the augmented information related to the one piece of the feature information from the image processing apparatus to the terminal.

21. An image processing method of an image processing apparatus connectable to a terminal which captures an image, the image processing method comprising:
    acquiring, at an image processing apparatus, augmented information and attribute information, which are related to feature information extracted from a captured image;
    if a plurality of pieces of the feature information is extracted, generating at least one piece of new augmented information by using a plurality of pieces of the acquired augmented information, based on a positional relationship between the extracted pieces of the feature information;
    transmitting, if a plurality of pieces of the feature information is extracted, the generated new augmented information from the image processing apparatus to the terminal; and
    transmitting, if one piece of the feature information is extracted, the augmented information related to the one piece of the feature information from the image processing apparatus to the terminal.

22. A computer-readable storage medium storing an executable program that when executed causes a computer to:
    acquire, from feature information extracted from a captured image, augmented information and attribute information which are related to the feature information;
    generate, if a plurality of pieces of the feature information is extracted, at least one piece of new augmented information by using a plurality of pieces of the acquired augmented information, based on satisfying a condition using a combination of the attribute information; and
    transmit, if a plurality of pieces of the feature information is extracted, the generated new augmented information to the terminal and transmit, if one piece of the feature information is extracted, the augmented information related to the one piece of the feature information to the terminal.

23. A computer-readable storage medium storing an executable program that when executed causes a computer to:
    acquire, from feature information extracted from a captured image, augmented information which is related to the feature information;
    generate, if a plurality of pieces of the feature information is extracted, at least one piece of new augmented information by using a plurality of pieces of the acquired augmented information, based on a positional relationship between the extracted pieces of the feature information; and
    transmit, if a plurality of pieces of the feature information is extracted, the generated new augmented information to the terminal, and transmit, if one piece of the feature information is extracted, the augmented information related to the one piece of the feature information to the terminal.

24. An image processing system comprising:
a terminal which captures an image, the terminal comprising
an image capturing unit configured to capture an image, and
a display unit configured to display the transmitted augmented information; and
an image processing apparatus configured for connection to the terminal, the image processing apparatus comprising
an acquisition unit configured to acquire, from feature information extracted from a capture image, augmented information and attribute information which are related to the feature information,
a processing unit configured to generate, if a plurality of pieces of the feature information is extracted, at least one piece of new augmented information by using a plurality of pieces of the augmented information acquired by the acquisition unit, based on satisfying a condition using a combination of the attribute information, and
a transmission unit configured to transmit, if a plurality of pieces of the feature information is extracted, the new augmented information generated by the processing unit to the terminal and to transmit, if one piece of the feature information is extracted, the augmented information related to the one piece of the feature information to the terminal.

25. The image processing system according to claim 24, wherein the image capturing unit captures an image of a document.

26. An image processing system comprising:
a terminal which captures an image, the terminal comprising
an image capturing unit configured to capture an image, and
a display unit configured to display the transmitted augmented information; and
an image processing apparatus configured for connection to the terminal, the image processing apparatus comprising
an acquisition unit configured to acquire, from feature information extracted from a captured image, augmented information which are related to the feature information,
a processing unit configured to generate, if a plurality of pieces of the feature information is extracted, at least one piece of new augmented information by using a plurality of pieces of the augmented information acquired by the acquisition unit, based on a positional relationship between the extracted pieces of the feature information, and
a transmission unit configured to transmit, if a plurality of pieces of the feature information is extracted, the new augmented information generated by the processing unit to the terminal and to transmit, if one piece of the feature information is extracted, the augmented information related to the one piece of the feature information to the terminal.

* * * * *